United States Patent
Poornachandran et al.

(10) Patent No.: US 10,061,424 B2
(45) Date of Patent: Aug. 28, 2018

(54) TECHNOLOGIES FOR DYNAMIC DISPLAY WITH A TRANSFORMABLE DISPLAY

(71) Applicant: Intel Corporation, Santa Clara, CA (US)

(72) Inventors: Rajesh Poornachandran, Portland, OR (US); Vincent J. Zimmer, Federal Way, WA (US); Nicholas J. Adams, Beaverton, OR (US); Nithyananda S. Jeganathan, Portland, OR (US); Gunner D. Danneels, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,314

(22) Filed: Dec. 26, 2015

(65) Prior Publication Data
US 2017/0185207 A1    Jun. 29, 2017

(51) Int. Cl.
*G06F 3/041* (2006.01)
*G06F 1/16* (2006.01)

(52) U.S. Cl.
CPC .......... *G06F 3/0416* (2013.01); *G06F 1/1652* (2013.01); *G06F 3/0412* (2013.01)

(58) Field of Classification Search
CPC ........... G06F 1/1677; G06F 2200/1614; G06F 1/162; G06F 1/1649; G06F 1/206; G06F 3/0488
See application file for complete search history.

(56) References Cited

U.S. PATENT DOCUMENTS

| | | | |
|---|---|---|---|
| 7,472,267 B2* | 12/2008 | Park | G06F 1/162 713/1 |
| 2010/0058205 A1 | 3/2010 | Vakil et al. | |
| 2010/0117975 A1 | 5/2010 | Cho | |
| 2012/0243165 A1* | 9/2012 | Chang | G06F 1/1647 361/679.27 |
| 2012/0329528 A1 | 12/2012 | Song | |
| 2013/0176291 A1* | 7/2013 | Leonard | G09G 5/10 345/207 |
| 2013/0215011 A1 | 8/2013 | Ke | |
| 2013/0271378 A1* | 10/2013 | Hulford | G06F 3/14 345/168 |
| 2014/0306908 A1 | 10/2014 | Nagaraju | |

(Continued)

OTHER PUBLICATIONS

Asus Tachi Ultrabook product web page, downloaded from https://www.asus.com/Notebooks_Ultrabooks/ADUS_TACHI_/, retrieved Jun. 29, 2015.

(Continued)

*Primary Examiner* — Viet Pham
(74) *Attorney, Agent, or Firm* — Barnes & Thornburg LLP

(57) ABSTRACT

Technologies for dynamic display include a mobile compute device that comprises a display transformable between at least two different physical topologies. The mobile compute device determines a current physical topology of the display and retrieves a policy based on the determined current physical topology. The policy identifies a corresponding action to occur in response to each of one or more user inputs to the mobile compute device while the display has the current physical topology. The mobile compute device processes a user input based on the retrieved policy.

23 Claims, 4 Drawing Sheets

(56) References Cited

U.S. PATENT DOCUMENTS

| | | | | |
|---|---|---|---|---|
| 2014/0380227 A1* | 12/2014 | Ng | ........................ | G06F 1/1616 715/778 |
| 2015/0092323 A1* | 4/2015 | Feng | ..................... | G06F 1/1671 361/679.1 |
| 2015/0116364 A1* | 4/2015 | Aurongzeb | ........... | G06F 3/0487 345/659 |

OTHER PUBLICATIONS

International search report for PCT application No. PCT/US2016/063589, dated Mar. 13, 2017 (3 pages).

Written opinion for PCT application No. PCT/US2016/063589, dated Mar. 13, 2017 (7 pages).

* cited by examiner

TECHNOLOGIES FOR DYNAMIC DISPLAY WITH A TRANSFORMABLE DISPLAY

BACKGROUND

Touchscreen displays allow a user to both view images rendered on a screen for the user's consumption and to interact with the display to provide user inputs. For example, a user may tap or swipe the display to navigate from one portion of an application or webpage to another portion. The introduction of foldable and flexible displays to the market have significantly expanded the possibilities in terms of an improved user experience. Such displays may allow users to fold, unfold, roll, unroll, and/or otherwise physically manipulate the display to change its form. For example, a user may desire a device that may be folded until it is sized to fit in her pocket.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
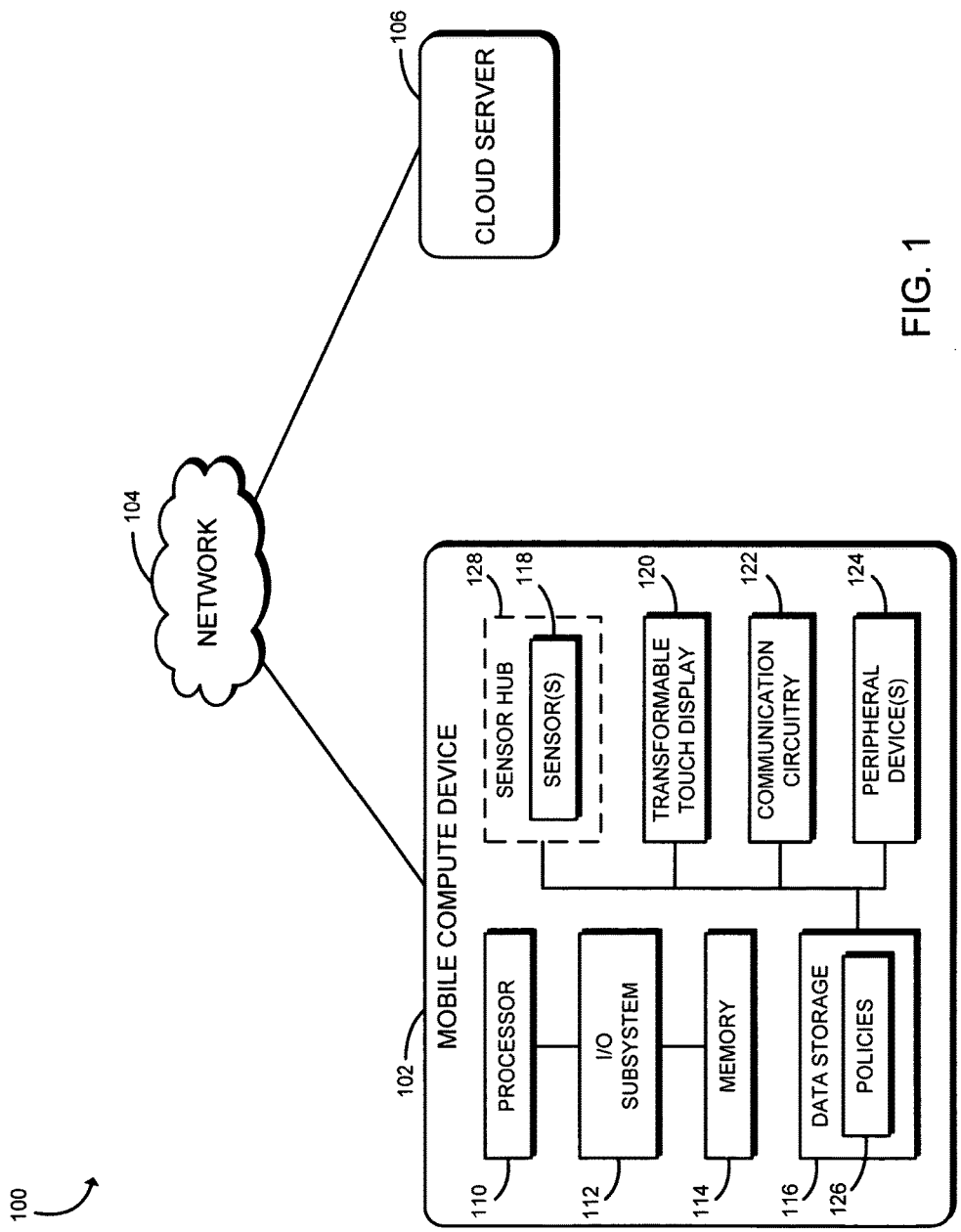
FIG. 1 is a simplified block diagram of at least one embodiment of a system for dynamic display with a transformable display.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for dynamic display with a transformable display includes a mobile compute device 102, a network 104, and a cloud server 106. Although only one mobile compute device 102, one network 104, and one cloud server 106 are illustratively shown in FIG. 1, the system 100 may include any number of mobile compute devices 102, networks 104, and/or cloud servers 106 in other embodiments. For example, in some embodiments, multiple mobile compute devices 102 may interact with the same cloud server 106 (e.g., for crowd-based machine learning).

As described in detail below, in the illustrative embodiment, the mobile compute device 102 is configured to monitor the physical topology (e.g., physical form) of a transformable display of the mobile compute device 102 and interpret user inputs and/or perform corresponding actions based on the current topology. To do so, the mobile compute device 102 retrieves a policy corresponding with the current physical topology of the display, for example, following a change in the physical topology. Further, as described below, the mobile compute device 102 may permit a user to register gestures (e.g., taps, swipes, etc.) as trigger events to enable/disable a particular topology mode and/or perform some action while in a particular physical topology.

The mobile compute device 102 may be embodied as any type of computing device including a transformable display and capable of performing the functions described herein. For example, the mobile compute device 102 may be embodied as a smartphone, cellular phone, wearable computing device, personal digital assistant, mobile Internet device, tablet computer, netbook, notebook, Ultrabook™, laptop computer, and/or any other mobile computing/communication device. Although the illustrative mobile compute device 102 is described herein as a mobile device, it should be appreciated that the compute device 102 may be a "stationary" compute device in other embodiments (e.g., a desktop computer, all-in-one computer, etc.).

As shown in FIG. 1, the illustrative mobile compute device 102 includes a processor 110, an input/output ("I/O") subsystem 112, a memory 114, a data storage 116, one or more sensors 118, a transformable touch display 120, a communication circuitry 122, and one or more peripheral devices 124. Of course, the mobile compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile compute device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the mobile compute device 102 as described herein. For example, the data storage 116 may include one or more policies 126 associated with the various physical topologies supported by the transformable touch display 120 as described herein.

The sensors 118 may be embodied as any sensors configured to generate data/signals indicative of an environment or context of the mobile compute device 102 and/or user of the mobile compute device 102. For example, in the illustrative embodiment, the sensors 118 are configured to sense characteristics that may be utilized by the mobile compute device 102 to determine the current physical topology of the mobile compute device 102 and/or other state information. Additionally, the sensors 118 may sense the user's physical manipulations of the mobile compute device 102 and/or other interactions with the device 102, which may be processed as user input. In various embodiments, the sensors 118 may be embodied as, or otherwise include, for example, inertial sensors, pressure sensors, position sensors, location sensors, proximity sensors, optical sensors, light sensors, audio sensors, temperature sensors, motion sensors, piezoelectric sensors, cameras, and/or other types of sensors. Of course, the mobile compute device 102 may also include components and/or devices configured to facilitate the use of the sensor(s) 118. Depending on the particular embodiment, the sensors 118 may include hardware sensors and/or software sensors (e.g., software sensors to identify software applications executed at a particular point in time). In some embodiments, one or more of the sensors 118 may form a portion of, or be coupled to, a sensor hub 128.

The transformable touch display 120 may be embodied as any type of display on which information may be displayed to a viewer of the mobile compute device 102 and that may be physically manipulated/transformed to change its form (e.g., its physical topology). Further, in the illustrative embodiment, the transformable touch display 120 is configured to sense tactile input provided by a user (e.g., via an integrated touch controller). It should be appreciated that the display 120 may utilize any suitable display technology and/or mechanical structure to permit the physical topology of the display 120 to be transformed (e.g., bent, folded, unfolded, rolled, unrolled, etc.) and otherwise perform the functions described herein.

The communication circuitry 122 may be embodied as any communication circuit, device, or collection thereof, capable of enabling communications between the mobile compute device 102 and other remote devices (e.g., the cloud server 106) over a network (e.g., the network 104). The communication circuitry 122 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 124 may include any number of additional peripheral or interface devices, such as speakers, microphones, additional storage devices, and so forth. The particular devices included in the peripheral devices 124 may depend on, for example, the type and/or intended use of the mobile compute device 102.

The network 104 may be embodied as any type of communication network capable of facilitating communication between the mobile compute device 102 and remote devices (e.g., the cloud server 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The cloud server 106 may be embodied as any type of computing device capable of performing the functions described herein. For example, in some embodiments, the cloud server 106 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. Further, the cloud server 106 may include components similar to those of the mobile compute device 102 discussed above. The description of those components of the mobile compute device 102 is equally applicable to the description of components of the cloud server 106 and is not repeated herein for clarity of the description. Further, it should be appreciated that the cloud server 106 may include other components, sub-components, and devices commonly found in a computing device, which are not discussed above in reference to the mobile compute device 102 and not discussed herein for clarity of the description. Additionally, in some embodiments, one or more of the components of the mobile compute device 102 may be omitted from the cloud server 106 (e.g., the sensors 118, transformable touch display 120, and/or sensor hub 128).

Figure 2:
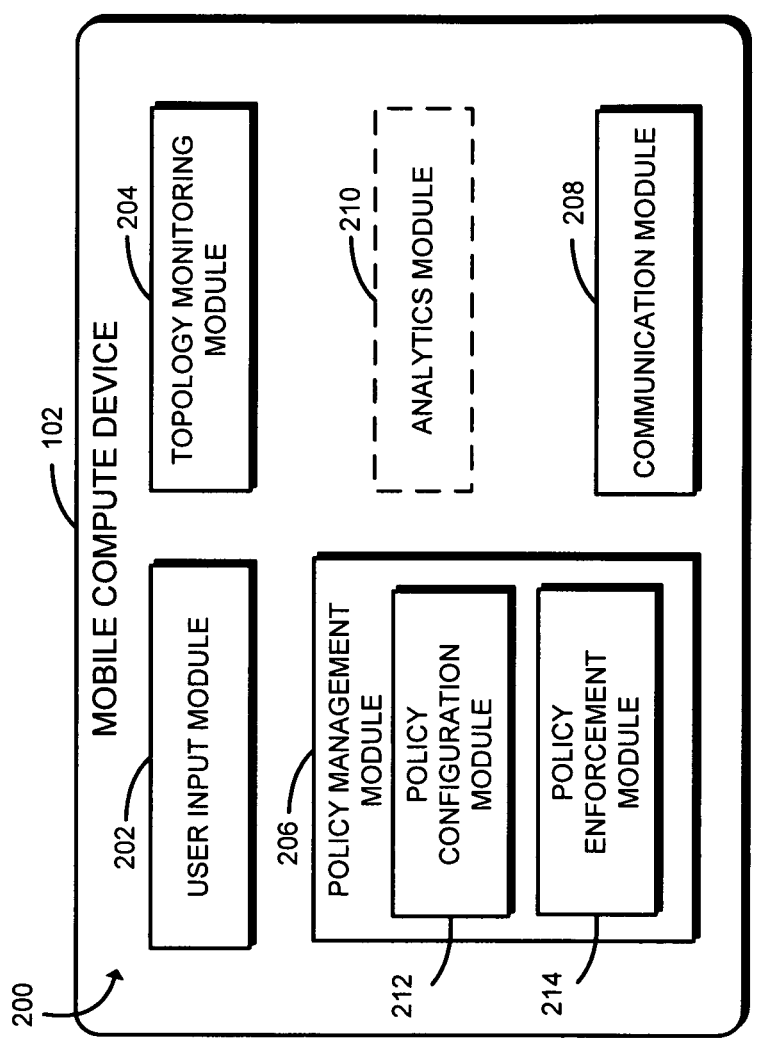
FIG. 2 is a simplified block diagram of at least one embodiment of an environment of a mobile compute device of the system of FIG. 1.

Referring now to FIG. 2, in use, the mobile compute device 102 establishes an environment 200 for dynamic display. The illustrative environment 200 includes a user input module 202, a topology monitoring module 204, a policy management module 206, and a communication module 208. Additionally, in some embodiments, the environment 200 may include an analytics module 210. As shown in FIG. 2, the illustrative policy management module 206 includes a policy configuration module 212 and a policy enforcement module 214. The various modules of the environment 200 may be embodied as hardware, software, firmware, or a combination thereof. For example, the various modules, logic, and other components of the environment 200 may form a portion of, or otherwise be established by, the processor 110 or other hardware components of the mobile compute device 102. As such, in some embodiments, one or more of the modules of the environment 200 may be embodied as circuitry or collection of electrical devices (e.g., a user input circuitry, a topology monitoring circuitry, a policy management circuitry, a communication circuitry, an analytics circuitry, a policy configuration circuitry, and/or a policy enforcement circuitry). Additionally, in some embodiments, one or more of the illustrative modules may form a portion of another module and/or one or more of the illustrative modules may be independent of one another.

The user input module 202 is configured to permit the user to interact with and/or provide feedback to the mobile compute device 102. For example, in the illustrative embodiment, the user may provide tactile feedback/input to the mobile compute device 102 via a touchscreen of the transformable touch display 120. Further, in some embodiments, the user input module 202 may receive/process user input in the form of audio (e.g., voice input), gaze tracking, and/or other sensed data.

The topology monitoring module 204 is configured to monitor the physical topology (e.g., physical form) of the transformable touch display 120 based on sensor data generated by the sensors 118. As such, in the illustrative embodiment, the topology monitoring module 204 may determine when the transformable touch display 120 has changed its physical form (e.g., from a current physical topology to a different physical topology). It should be appreciated that the transformable touch display 120 may be configured in a wide array of physical topologies depending on the particular embodiment. For example, in some embodiments, the display 120 may be transformed from a folded smartphone topology to a miniature tablet topology by unfolding the display 120 and transformed from the miniature tablet topology to a standard tablet topology by again unfolding the display 120. Further, in some embodiments, the transformable touch display 120 may be rolled or unrolled, for example, to dynamically change the screen size.

The policy management module 206 is configured to retrieve a policy 126 based on the current physical topology of the transformable touch display 120. As described herein, the various policies 126 may include different rules for enforcement (e.g., different actions to occur in response to user input). For example, in some embodiments, the display 120 may be transformed from having a display screen on a single side of the mobile compute device 102 (e.g., a tablet configuration) to having a display screen on both sides of the mobile compute device 102 (e.g., the display 120 may be folded in half). In such embodiments, policy management module 206 may retrieve the policy 126 for the topology associated with the two display screens in response to identifying that the topology change occurred (e.g., by the topology monitoring module 204). Further, in some embodiments, the policy 126 may indicate whether the display screen to the "back" or world-facing side of the mobile compute device 102 should receive power and/or whether one or more features should be activated (e.g., tactile input). As such, it should be appreciated that the policy 126 may identify a power/thermal state associated with each region of the display 120 while the display 120 has the topology corresponding with that policy 126. Accordingly, in some embodiments, the policy 126 may define one or more outputs or output parameters (e.g., display parameters, power/thermal state, etc.) associated with a particular physical topology.

As indicated above, the illustrative policy management module 206 includes the policy configuration module 212 and the policy enforcement module 214. The policy configuration module 212 permits a user of the mobile compute device 102 to update or modify one or more of the policies 126. In the illustrative embodiment, the user may update a policy 126 to change a corresponding action to occur in response to a particular input while the display 120 has the corresponding topology. For example, the user may configure the policy 126 associated with the two-sided display 120 described above such that the back portion of the display 120 is disabled (e.g., to save battery life and/or avoid inadvertent touch inputs). Similarly, in some embodiments, the policy 126 may indicate that a rolled up portion of the display 120 may be unpowered or disabled.

It should be further appreciated that, in some embodiments, the policy configuration module 212 may update a policy 126 based on user input to register gestures (e.g., taps, swipes, etc.) as trigger events to enable/disable a particular topology mode and/or perform some action while in a particular physical topology. For example, in the two-sided display 120 embodiment described above, the policy 126 may be configured such that the user can draw a gesture (e.g., an "S" symbol) to enable content rendering on the back portion of the display 120, draw another gesture (e.g., a "U" symbol) to enable tactile/touch input alone (but not image rendering) on the back portion of the display 120 (e.g., to permit scrolling and/or gaming controls without obstructing the content on the front portion of the display 120), and/or draw yet another gesture (e.g., a "2" symbol) to enable both tactile/touch input and image rendering on the back portion of the display 120.

The policy enforcement module 214 is configured to enforce the policy 126 corresponding with the current physical topology of the transformable touch display 120. For example, as described above, the policy enforcement module 214 may ensure that the appropriate actions occur in response to gestures registered in association with the physical topology. It should be appreciated that, in some embodiments, the policy enforcement module 214 may interact with various components of the mobile compute device 102 to enforce the policies 126. For example, the policy enforcement module 214 may handle power/thermal management for the transformable touch display 120 and/or other components of the mobile compute device 102 (e.g., the sensors 118).

The communication module 208 handles the communication between the mobile compute device 102 and other computing devices of the system 100 (e.g., the cloud server 106). For example, as described herein, the mobile compute device 102 may receive one or more of the policies 126 from the cloud server 106 and/or transmit sensor data or other data to the cloud server 106 (e.g., for machine learning).

As described above, in some embodiments, the mobile compute device 102 may include an analytics module 210. In such embodiments, the analytics module 210 may be utilized for adaptive learning or machine learning. Accordingly, in some embodiments, the analytics module 210 may store sensor data or data associated with the various topologies entered by the display 120 and/or transmit such data to the cloud server 106.

Figure 3:
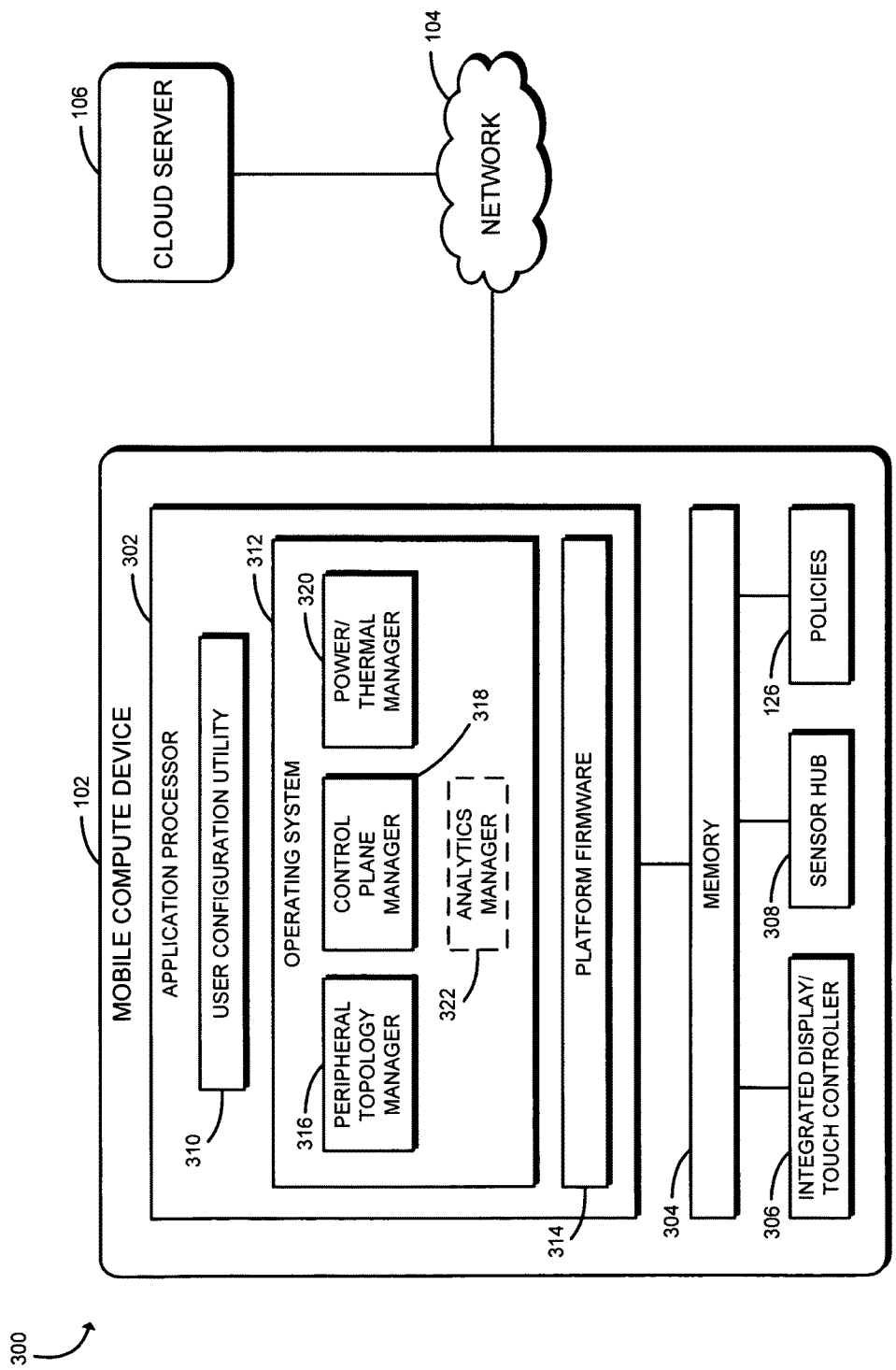
FIG. 3 is a simplified block diagram of at least one embodiment of an illustrative architecture of the mobile compute device of the system of FIG. 1.

Referring now to FIG. 3, an illustrative architecture 300 of the mobile compute device 102 of the system 100 for dynamic display on the transformable touch display 120 is shown. The illustrative architecture 300 includes an application processor 302, a memory 304, an integrated display/touch controller 306, a sensor hub 308, and one or more policies 126. Further, the illustrative application processor 302 includes or executes a user configuration utility 310, an operating system 312, and a platform firmware 314. As shown, the operating system 312 may establish and/or utilize a peripheral topology manager 316, a control plane manager 318, a power/thermal manager 320 and, in some embodiments, an analytics manager 322. In the illustrative embodiment, the integrated display/touch controller 306 and the sensor hub 308 are hardware components and the peripheral topology manager 316, the control plane manager 318, the power/thermal manager 320, and the analytics manager 322 are software components running on the operating system 312 of the mobile compute device 102. Additionally, in some embodiments, the user configuration utility 310 may be embodied as a software component running on the operating system 312. However, in other embodiments, it should be appreciated that each of the components of the architecture 300 of the mobile compute device 102 may be embodied as hardware, firmware, and/or software. It should be further appreciated that one or more components of the architecture 300 may include, incorporate, or form a portion of one or modules of the environment 200.

In the illustrative embodiment, the integrated display/touch controller 306 is embodied as a flexible and/or foldable integrated display and touch controller that a user may fold, unfold, roll, unroll, and/or otherwise manipulate. In some embodiments, the integrated display/touch controller 306 is tightly coupled with the sensor hub 308. The sensor hub 308 is configured to determine the current topology configuration based on data generated by sensors coupled to the sensor hub 308 (e.g., the sensors 118). Further, the sensor hub 308 may sense user inputs including, for example, touch, taps, gestures, and/or other inputs that may be used to change and/or manage topology configurations. The illustrative peripheral topology manager 316 allows the operating system 312 to interpret the current topology of the display 120 from the platform firmware 314. In some embodiments, the control plane manager 318 may manage topology configurations mandated by the user and/or may have the ability to influence the power/thermal management of the mobile compute device 102 (e.g., display, touch, etc.), which may be controlled by the power/thermal manager 320. In some embodiments, the analytics manager 322 may be responsible for topology changes trigger by a user on the mobile compute device 102 and associate it with the platform execution context. Such data may be uploaded to the cloud server 106, for example, to learn methodologies that may be employed to improve the intuitiveness for future improved user experience. The user configuration utility 310 may provide a user interface that permits the user to configure/manage the policies 126 associated with the different topology configurations supported by the mobile compute device 102.

Figure 4:
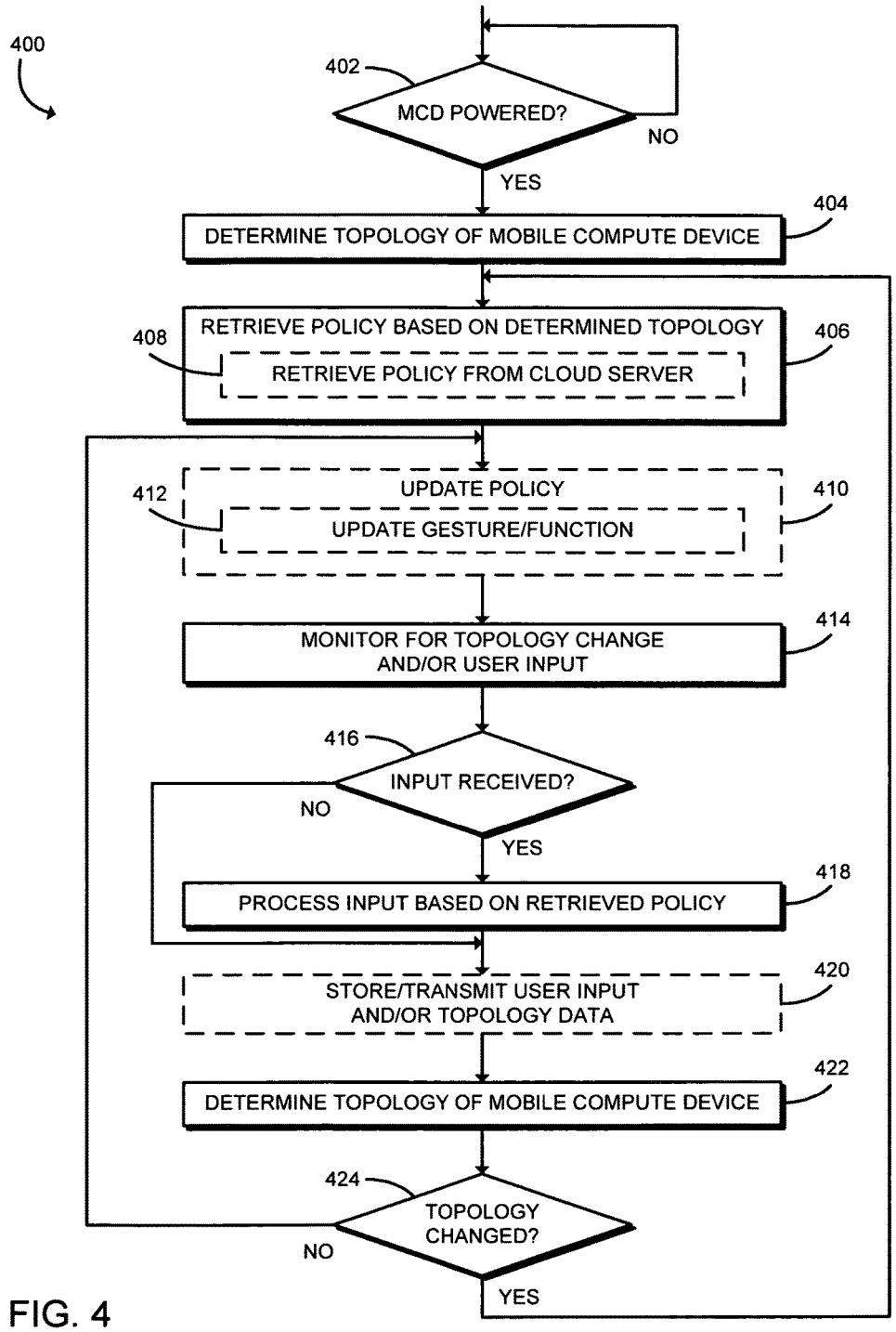
FIG. 4 is a simplified flow diagram of at least one embodiment of a method for dynamic display that may be executed by the mobile compute device of FIG. 2.

Referring now to FIG. 4, in use, the mobile compute device 102 may execute a method 400 for dynamic display. The illustrative method 400 begins with block 402 in which the mobile compute device (MCD) 102 determines whether it is powered. If so, in block 404, the mobile compute device 102 determines a current topology of the mobile compute device 102 or, more particularly, of the transformable touch display 120. For example, as described above, the mobile compute device 102 may determine the topology of the mobile compute device 102 based on sensor data generated by the sensors 118. In block 406, the mobile compute device 102 retrieves a policy 126 based on the determined topology. In other words, in the illustrative embodiment, the mobile compute device 102 retrieves the policy 126 corresponding with the current topology of the mobile compute device 102. In doing so, in block 408, the mobile compute device 102 may retrieve the policy 126 from the cloud server 106. Of course, in other embodiments, the policies 126 may be stored locally on the mobile compute device 102 and retrieved from the memory 114 or data storage 116.

In block 410, the mobile compute device 102 may update the policy 126 based on user input to change one or more features of the policy 126. Further, in block 412, the mobile compute device 102 may update one or more gestures/functions defined in the policy 126. For example, the mobile compute device 102 may update a control mechanism such as a touch, tap, gesture, gaze tracking, and/or other mechanism to trigger various functionality. It should be appreciated that, in some embodiments, a user of the mobile compute device 102 may update the policy 126 at any point in time.

In block 414, the mobile compute device 102 monitors the sensor data generated by the sensors 118 for a topology change and/or user input. If the mobile compute device 102 determines in block 416 that a user input has been sensed, the mobile compute device 102 processes the input based on the retrieved policy 126 in block 418. For example, as described above, in some embodiments, the mobile compute device 102 may include two different topology configurations for a two-screen display 120 in which one screen is on the "front" of the mobile compute device 102 and the other screen is on the "back" of the mobile compute device 102, one for which touch is enabled on the back screen and one for which touch is disabled on the back screen. User inputs associated with the back screen of the display 120 may be processed differently depending on the requirements of the policy 126 associated with that physical topology.

In block 420, the mobile compute device 102 may store and/or transmit the user input and/or topology data associated with the current topology to the cloud server 106. It should be appreciated that the mobile compute device 102 may store and/or transmit data at any stage throughout the method 400. For example, in some embodiments, the mobile compute device 102 may store/transmit such data each time there is a new user input and/or a change in the topology of the mobile compute device 102. In block 422, the mobile compute device 102 determines the current topology of the mobile compute device 102.

If the mobile compute device 102 determines, in block 424, that there has been no change in the topology, the method 400 returns to block 412 in which the mobile compute device 102 may update the policy 126. However, if the mobile compute device 102 determines that there has been a change in the topology of the mobile compute device 102, the method 400 returns to block 406 in which the mobile compute device 102 retrieves the policy 126 based on the new topology. In other words, in the illustrative embodiment, the mobile compute device 102 retrieves and enforces the policy 126 associated with the new topology each time the topology has changed in order to ensure that the user inputs and other functions of the mobile compute device 102 are handled appropriately.

EXAMPLES

Illustrative examples of the technologies disclosed herein are provided below. An embodiment of the technologies may include any one or more, and any combination of, the examples described below.

Example 1 includes a mobile compute device for dynamic display with integrated touch, the mobile compute device comprising a display comprising an integrated touch controller and transformable between at least two different physical topologies; a topology monitoring module to determine a current physical topology of the display; a policy management module to retrieve a policy based on the determined current physical topology, wherein the policy identifies a corresponding action to occur in response to each of one or more user inputs to the mobile compute device while the display has the current physical topology; and a user input module to process a user input based on the retrieved policy.

Example 2 includes the subject matter of Example 1, and wherein to retrieve the policy comprises to retrieve the policy from a cloud server.

Example 3 includes the subject matter of any of Examples 1 and 2, and further including one or more sensors, wherein the topology monitoring module is further to monitor sensor data of the one or more sensors to determine whether the display has changed from the current physical topology to a different physical topology.

Example 4 includes the subject matter of any of Examples 1-3, and wherein the policy management module is further to determine a different policy based on the different physical topology.

Example 5 includes the subject matter of any of Examples 1-4, and wherein to determine whether the display has changed from the current physical topology to the different physical topology comprises to determine whether the display has been at least one of folded, unfolded, rolled, or unrolled.

Example 6 includes the subject matter of any of Examples 1-5, and wherein the policy management module is further to update the policy to change the corresponding action to occur in response to one of the one or more inputs while the display has the current physical topology.

Example 7 includes the subject matter of any of Examples 1-6, and wherein the policy further identifies at least one of a power state or a thermal state of each region of the display while the display has the current physical topology.

Example 8 includes the subject matter of any of Examples 1-7, and wherein the policy management module is further to receive a user input to register a gesture to change the physical topology of the display.

Example 9 includes the subject matter of any of Examples 1-8, and further including a sensor hub that includes a plurality of sensors, wherein the topology monitoring module is to determine the current physical topology of the display based on sensor data of the plurality of sensors.

Example 10 includes the subject matter of any of Examples 1-9, and further including an analytics module to store at least one of the current physical topology or the user input.

Example 11 includes the subject matter of any of Examples 1-10, and wherein the analytics module is further to store data associated with each transformation of the display between different physical topologies and data associated with each policy enforcement action.

Example 12 includes the subject matter of any of Examples 1-11, and further including an analytics module to transmit at least one of the current physical topology or the user input to a cloud server.

Example 13 includes a method for dynamic display on a display transformable between at least two different physical topologies, the method comprising determining, by a mobile compute device, a current physical topology of the display; retrieving, by the mobile compute device, a policy based on the determined current physical topology, wherein the policy identifies a corresponding action to occur in response to each of one or more user inputs to the mobile compute device while the display has the current physical topology; and processing, by the mobile compute device, a user input based on the retrieved policy.

Example 14 includes the subject matter of Example 13, and wherein retrieving the policy comprises retrieving the policy from a cloud server.

Example 15 includes the subject matter of any of Examples 13 and 14, and further including monitoring, by the mobile compute device, sensor data of one or more sensors of the mobile compute device to determine whether the display has changed from the current physical topology to a different physical topology.

Example 16 includes the subject matter of any of Examples 13-15, and further including determining, by the mobile compute device, a different policy based on the different physical topology.

Example 17 includes the subject matter of any of Examples 13-16, and wherein determining whether the display has changed from the current physical topology to the different physical topology comprises determining whether the display has been at least one of folded, unfolded, rolled, or unrolled.

Example 18 includes the subject matter of any of Examples 13-17, and further including updating, by the mobile compute device, the policy to change the corresponding action to occur in response to one of the one or more inputs while the display has the current physical topology.

Example 19 includes the subject matter of any of Examples 13-18, and wherein the policy further identifies at least one of a power state or a thermal state of each region of the display while the display has the current physical topology.

Example 20 includes the subject matter of any of Examples 13-19, and further including receiving, by the mobile compute device, a user input to register a gesture to change the physical topology of the display.

Example 21 includes the subject matter of any of Examples 13-20, and further including determining, by the mobile compute device, the current physical topology of the display based on sensor data generated by a plurality of sensors of a sensor hub of the mobile compute device.

Example 22 includes the subject matter of any of Examples 13-21, and further including storing, by the mobile compute device, at least one of the current physical topology or the user input.

Example 23 includes the subject matter of any of Examples 13-22, and further including storing, by the mobile compute device, data associated with each transformation of the display between different physical topologies and data associated with each policy enforcement action.

Example 24 includes the subject matter of any of Examples 13-23, and further including transmitting, by the mobile compute device, at least one of the current physical topology or the user input to a cloud server.

Example 25 includes a computing device comprising a processor; and a memory having stored therein a plurality of instructions that when executed by the processor cause the computing device to perform the method of any of Examples 13-24.

Example 26 includes one or more machine-readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a mobile compute device for dynamic display with integrated touch, the mobile compute device comprising means for determining a current physical topology of the display; means for retrieving a policy based on the determined current physical topology, wherein the policy identifies a corresponding action to occur in response to each of one or more user inputs to the mobile compute device while the display has the current physical topology; and means for processing a user input based on the retrieved policy.

Example 29 includes the subject matter of Example 28, and wherein the means for retrieving the policy comprises means for retrieving the policy from a cloud server.

Example 30 includes the subject matter of any of Examples 28 and 29, and further including means for monitoring sensor data of one or more sensors of the mobile compute device to determine whether the display has changed from the current physical topology to a different physical topology.

Example 31 includes the subject matter of any of Examples 28-30, and further including means for determining a different policy based on the different physical topology.

Example 32 includes the subject matter of any of Examples 28-31, and wherein the means for determining whether the display has changed from the current physical topology to the different physical topology comprises means for determining whether the display has been at least one of folded, unfolded, rolled, or unrolled.

Example 33 includes the subject matter of any of Examples 28-32, and further including means for updating the policy to change the corresponding action to occur in response to one of the one or more inputs while the display has the current physical topology.

Example 34 includes the subject matter of any of Examples 28-33, and wherein the policy further identifies at least one of a power state or a thermal state of each region of the display while the display has the current physical topology.

Example 35 includes the subject matter of any of Examples 28-34, and further including means for receiving a user input to register a gesture to change the physical topology of the display.

Example 36 includes the subject matter of any of Examples 28-35, and further including means for determining the current physical topology of the display based on sensor data generated by a plurality of sensors of a sensor hub of the mobile compute device.

Example 37 includes the subject matter of any of Examples 28-36, and further including means for storing at least one of the current physical topology or the user input.

Example 38 includes the subject matter of any of Examples 28-37, and further including means for storing data associated with each transformation of the display between different physical topologies and data associated with each policy enforcement action.

Example 39 includes the subject matter of any of Examples 28-38, and further including means for transmitting at least one of the current physical topology or the user input to a cloud server.

The invention claimed is:

1. A mobile compute device for dynamic display with integrated touch, the mobile compute device comprising:
   a display comprising an integrated touch controller and transformable between at least two different physical topologies;
   a topology monitoring module to determine a current physical topology of the display;
   a policy management module to retrieve a policy of a plurality of policies based on the determined current physical topology, wherein the policy identifies a corresponding action to occur in response to a user input that can be detected by the mobile compute device while the display has the current physical topology, and wherein each other policy of the plurality of policies identifies a different action to occur in response to detection of the same user input while the display is in a different physical topology than the current physical topology; and
   a user input module to detect the user input,
   wherein the policy management module is further to update the retrieved policy in response to a determination that the user input has been detected, wherein the updated retrieved policy includes one or more trigger events, and wherein each of the one or more trigger events enable or disable a particular function of the mobile compute device while in the current physical topology.

2. The mobile compute device of claim 1, wherein to retrieve the policy comprises to retrieve the policy from a cloud server.

3. The mobile compute device of claim 1, further comprising one or more sensors, wherein the topology monitoring module is further to monitor sensor data of the one or more sensors to determine whether the display has changed from the current physical topology to a different physical topology.

4. The mobile compute device of claim 3, wherein the policy management module is further to determine a different policy based on the different physical topology.

5. The mobile compute device of claim 3, wherein to determine whether the display has changed from the current physical topology to the different physical topology comprises to determine whether the display has been at least one of folded, unfolded, rolled, or unrolled.

6. The mobile compute device of claim 1, wherein the policy management module is further to update the policy to change the corresponding action to occur in response to one of the one or more inputs while the display has the current physical topology.

7. The mobile compute device of claim 1, wherein the policy further identifies at least one of a power state or a thermal state of each region of the display while the display has the current physical topology.

8. The mobile compute device of claim 1, further comprising a sensor hub that includes a plurality of sensors, wherein the topology monitoring module is to determine the current physical topology of the display based on sensor data of the plurality of sensors.

9. The mobile compute device of claim 1, further comprising an analytics module to store at least one of the current physical topology or the user input.

10. The mobile compute device of claim 1, further comprising an analytics module to transmit at least one of the current physical topology or the user input to a cloud server.

11. One or more machine-readable storage media comprising a plurality of instructions stored thereon that, in response to execution by a mobile compute device, causes the mobile compute device to:
determine a current physical topology of the display;
retrieve a policy of a plurality of policies based on the determined current physical topology, wherein the policy identifies a corresponding action to occur in response to a user input that can be detected by the mobile compute device while the display has the current physical topology, and wherein each other policy of the plurality of policies identifies a different action to occur in response to detection of the same user input while the display is in a different physical topology than the current physical topology;
detect a user input; and
update the retrieved policy in response to a determination that the user input has been detected, wherein the updated retrieved policy includes a trigger event, wherein the trigger event enables or disables a topology mode while in the current physical topology.

12. The one or more machine-readable storage media of claim 11, wherein to retrieve the policy comprises retrieving the policy from a cloud server.

13. The one or more machine-readable storage media of claim 11, wherein the plurality of instructions further causes the mobile compute device to monitor sensor data of one or more sensors of the mobile compute device to determine whether the display has changed from the current physical topology to a different physical topology.

14. The one or more machine-readable storage media of claim 13, wherein the plurality of instructions further causes the mobile compute device to determine a different policy based on the different physical topology.

15. The one or more machine-readable storage media of claim 13, wherein to determine whether the display has changed from the current physical topology to the different physical topology comprises to determine whether the display has been at least one of folded, unfolded, rolled, or unrolled.

16. The one or more machine-readable storage media of claim 11, wherein the plurality of instructions further causes the mobile compute device to update the policy to change the corresponding action to occur in response to one of the one or more inputs while the display has the current physical topology.

17. The one or more machine-readable storage media of claim 11, wherein the policy further identifies at least one of a power state or a thermal state of each region of the display while the display has the current physical topology.

18. The one or more machine-readable storage media of claim 11, wherein the plurality of instructions further causes the mobile compute device to determine the current physical topology of the display based on sensor data generated by a plurality of sensors of a sensor hub of the mobile compute device.

19. A method for dynamic display on a display transformable between at least two different physical topologies, the method comprising:
determining, by a mobile compute device, a current physical topology of the display;
retrieving, by the mobile compute device, a policy of a plurality of policies based on the determined current physical topology, wherein the policy identifies a corresponding action to occur in response to a user input that can be detected by the mobile compute device while the display has the current physical topology, and wherein each other policy of the plurality of policies identifies a different action to occur in response to detection of the same user input while the display is in a different physical topology than the current physical topology; and
detecting, by the mobile compute device, a user input;
updating, by the mobile compute device and in response to a determination that the user input has been detected, wherein the updated retrieved policy includes a trigger event, wherein the trigger event enables or disables a topology mode while in the current physical topology.

20. The method of claim 19, wherein retrieving the policy comprises retrieving the policy from a cloud server.

21. The method of claim 19, further comprising monitoring, by the mobile compute device, sensor data of one or more sensors of the mobile compute device to determine whether the display has changed from the current physical topology to a different physical topology.

22. The method of claim 21, wherein determining whether the display has changed from the current physical topology to the different physical topology comprises determining whether the display has been at least one of folded, unfolded, rolled, or unrolled.

23. The method of claim 19, further comprising updating, by the mobile compute device, the policy to change the corresponding action to occur in response to one of the one or more inputs while the display has the current physical topology.

* * * * *